US011416327B2

(12) United States Patent
Sayyed et al.

(10) Patent No.: US 11,416,327 B2
(45) Date of Patent: Aug. 16, 2022

(54) SYSTEM AND METHOD FOR INTELLIGENT FIRMWARE UPDATES, FIRMWARE RESTORE, DEVICE ENABLE OR DISABLE BASED ON TELEMETRY DATA ANALYTICS, AND DIAGNOSTIC FAILURE THRESHOLD FOR EACH FIRMWARE

(71) Applicant: Dell Products L.P., Round Rock, TX (US)

(72) Inventors: Ibrahim Sayyed, Georgetown, TX (US); Alok Pant, Austin, TX (US); Balasingh Ponraj Samuel, Round Rock, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 614 days.

(21) Appl. No.: 16/422,622

(22) Filed: May 24, 2019

(65) Prior Publication Data
US 2020/0371859 A1 Nov. 26, 2020

(51) Int. Cl.
*G06F 11/07* (2006.01)
*G06F 9/4401* (2018.01)
*G06F 8/65* (2018.01)
*G06F 21/57* (2013.01)
*G06F 13/20* (2006.01)

(52) U.S. Cl.
CPC ............ *G06F 11/0793* (2013.01); *G06F 8/65* (2013.01); *G06F 9/4401* (2013.01); *G06F 11/079* (2013.01); *G06F 11/0751* (2013.01);
*G06F 11/0775* (2013.01); *G06F 13/20* (2013.01); *G06F 21/575* (2013.01); *G06F 2221/034* (2013.01)

(58) Field of Classification Search
CPC ...... G06F 11/0793; G06F 8/65; G06F 9/4401; G06F 11/0751; G06F 11/0775; G06F 11/079; G06F 13/20; G06F 21/575; G06F 2221/034; G06F 21/572
See application file for complete search history.

(56) References Cited

U.S. PATENT DOCUMENTS

| 10,642,623 | B1* | 5/2020 | Righi | G06F 9/4403 |
|---|---|---|---|---|
| 10,963,333 | B1* | 3/2021 | Nijim | G06F 11/079 |
| 2010/0313072 | A1* | 12/2010 | Suffern | G06F 11/0793 |
| | | | | 714/37 |
| 2012/0159238 | A1* | 6/2012 | Wang | G06F 11/079 |
| | | | | 714/6.1 |
| 2014/0310222 | A1* | 10/2014 | Davlos | G06F 11/2294 |
| | | | | 706/46 |

(Continued)

*Primary Examiner* — Bryce P Bonzo
*Assistant Examiner* — Michael Xu
(74) *Attorney, Agent, or Firm* — Jackson Walker L.L.P.

(57) ABSTRACT

An information handling system may include at least one processor, and a memory coupled to the at least one processor. The information handling system may be configured to: detect a problem during a boot of the information handling system; transmit telemetry data associated with the problem to at least one remote telemetry server, wherein the at least one remote telemetry server is configured to analyze the telemetry data and other telemetry data from other information handling systems; receive resolution instructions from the at least one remote telemetry server; and implement a resolution of the detected problem based on the resolution instructions.

18 Claims, 3 Drawing Sheets

(56) References Cited

U.S. PATENT DOCUMENTS

| | | | |
|---|---|---|---|
| 2016/0299792 A1* | 10/2016 | Calhoun | G06F 11/3006 |
| 2016/0335151 A1* | 11/2016 | Swierk | G06F 21/50 |
| 2017/0177433 A1* | 6/2017 | Liang | G06Q 50/01 |
| 2017/0220404 A1* | 8/2017 | Polar Seminario | G06F 11/0736 |
| 2017/0235660 A1* | 8/2017 | Chana | H04L 41/5074 714/38.14 |
| 2017/0364406 A1* | 12/2017 | Kumar | G06F 11/0709 |
| 2018/0004502 A1* | 1/2018 | Samuel | G06F 8/71 |
| 2020/0133755 A1* | 4/2020 | Bansal | G06F 11/079 |
| 2020/0133820 A1* | 4/2020 | Olson | G06F 11/008 |
| 2020/0201706 A1* | 6/2020 | M. | G06F 11/079 |
| 2020/0226076 A1* | 7/2020 | Liu | G06F 8/656 |
| 2020/0306970 A1* | 10/2020 | Latkar | G06F 11/0793 |
| 2020/0310788 A1* | 10/2020 | Zimmer | G06F 8/65 |
| 2021/0049063 A1* | 2/2021 | Reed | G06F 11/0793 |

\* cited by examiner

SYSTEM AND METHOD FOR INTELLIGENT FIRMWARE UPDATES, FIRMWARE RESTORE, DEVICE ENABLE OR DISABLE BASED ON TELEMETRY DATA ANALYTICS, AND DIAGNOSTIC FAILURE THRESHOLD FOR EACH FIRMWARE

TECHNICAL FIELD

The present disclosure relates in general to information handling systems, and more particularly to systems and methods for managing information handling systems based on telemetry data.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various types of problems may arise during a boot of an information handling system (e.g., a host system), and existing ways of solving such problems have heretofore been limited. As one example, a hardware problem such as a network card failure might cause a pre-boot diagnostic tool to invoke a firmware update mechanism. Such a solution might or might not be sufficient to address the problem in a particular instance, but it lacks any ability to analyze the problem based on telemetry data from similar systems across the globe. The ability to obtain such telemetry data, failure count logs, etc. may allow embodiments of this disclosure to provide more appropriate and more helpful remedies in some cases.

As described in further detail below, a BIOS of an information handling system may implement more proactive and helpful solutions than have heretofore been available. Such solutions may in some embodiments be based on telemetry data from other systems that have encountered the same or similar problems. In other embodiments, such solutions may be provided via a management controller of an information handling system that is configured to provide management facilities (e.g., out-of-band management facilities for a host system).

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of information handling systems may be reduced or eliminated.

In accordance with embodiments of the present disclosure, an information handling system may include at least one processor, and a memory coupled to the at least one processor. The information handling system may be configured to: detect a problem during a boot of the information handling system; transmit telemetry data associated with the problem to at least one remote telemetry server, wherein the at least one remote telemetry server is configured to analyze the telemetry data and other telemetry data from other information handling systems; receive resolution instructions from the at least one remote telemetry server; and implement a resolution of the detected problem based on the resolution instructions.

In accordance with these and other embodiments of the present disclosure, a method may include detecting, by an information handling system, a problem during a boot of the information handling system; the information handling system transmitting telemetry data associated with the problem to at least one remote telemetry server, wherein the at least one remote telemetry server is configured to analyze the telemetry data and other telemetry data from other information handling systems; the information handling system receiving resolution instructions from the at least one remote telemetry server; and the information handling system implementing a resolution of the detected problem based on the resolution instructions.

In accordance with these and other embodiments of the present disclosure, a telemetry server information handling system may include at least one processor, and a memory coupled to the at least one processor. The telemetry server information handling system may be configured to: receive telemetry data from an information handling system, the telemetry data being associated with a problem detected during a boot of the information handling system; analyze the telemetry data and other telemetry data received from other information handling systems; and based on the analyzing, transmit resolution instructions to the information handling system, wherein the information handling system is configured to implement a resolution of the detected problem based on the resolution instructions.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
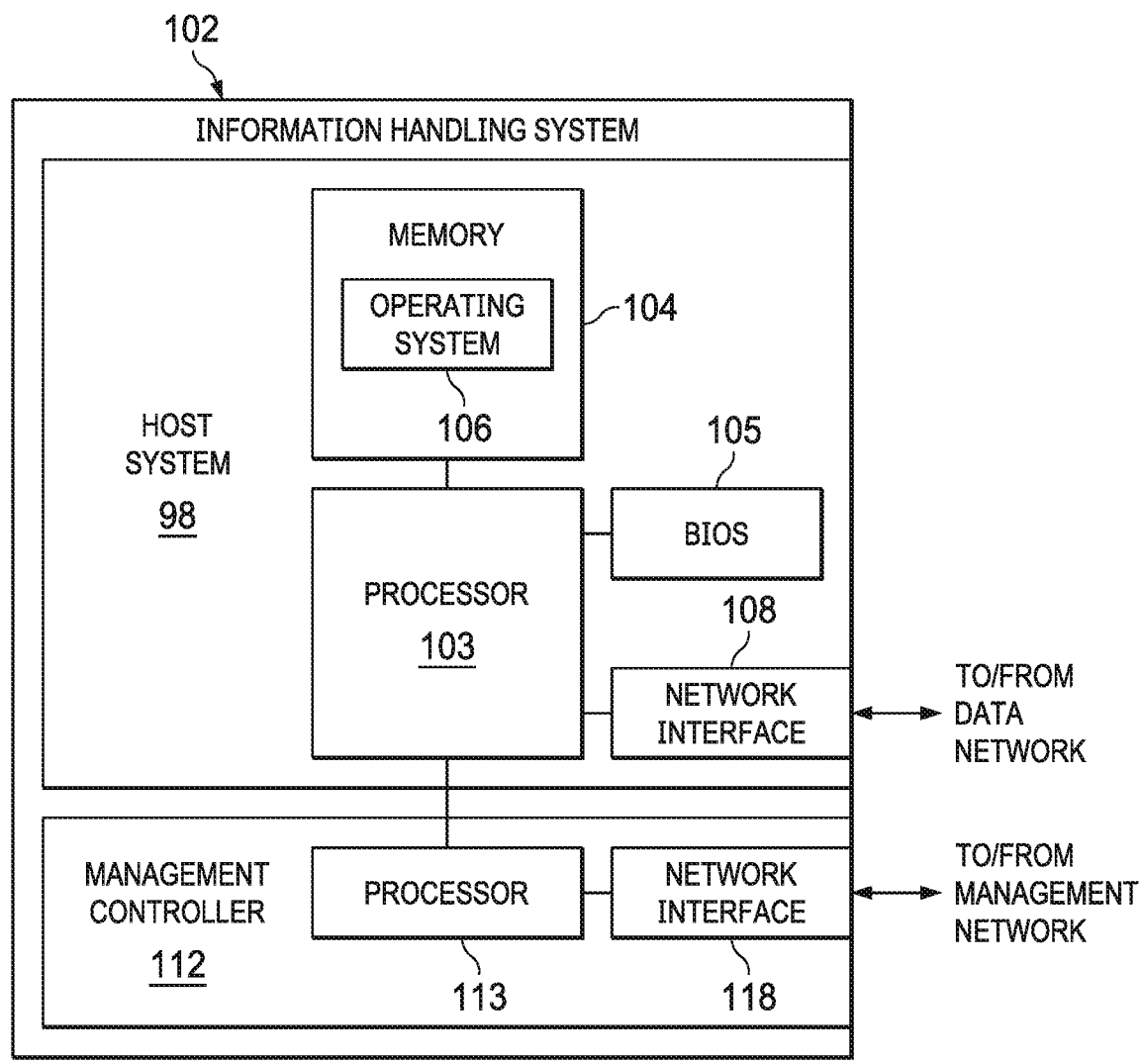
FIG. 1 illustrates a block diagram of an example information handling system, in accordance with embodiments of the present disclosure.
Figure 2:
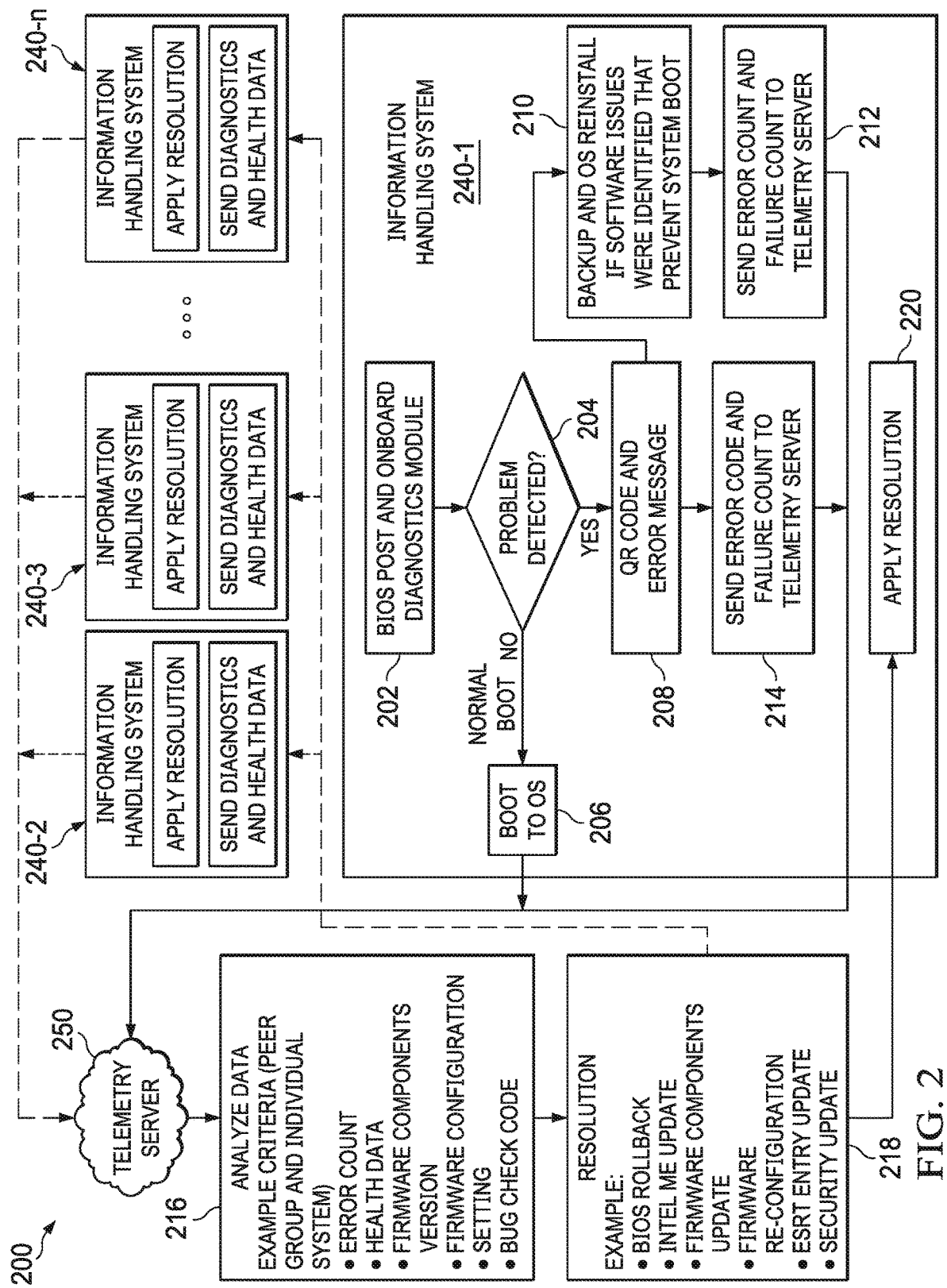
FIG. 2 illustrates an example flow diagram of a method in accordance with embodiments of the present disclosure.
Figure 3:
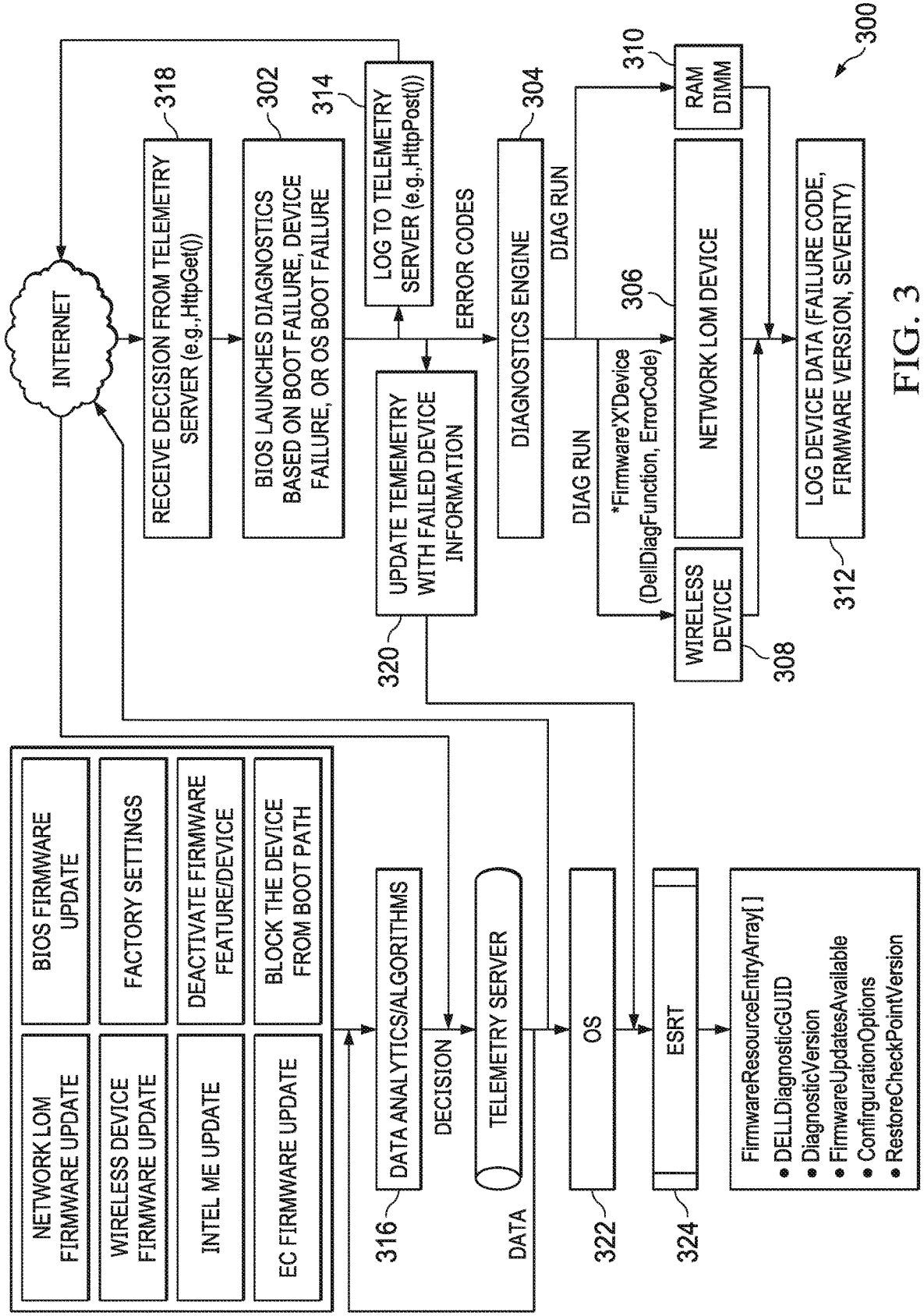
FIG. 3 illustrates an example flow diagram of a method in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

For the purposes of this disclosure, the term "telemetry data" may broadly refer to any diagnostic data related to problems or malfunctions in an information handling system. For example, telemetry data may include an error code, a type of error, information about a particular information handling resource, version information for hardware/software/firmware, etc. Telemetry data may typically be transmitted from one or more information handling systems to a remote telemetry server, which may be configured to aggregate and analyze telemetry data from many different sources.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

This disclosure provides various features useful in addressing failures that may be encountered during a boot of an information handling system. In some embodiments, during the boot process, the logs for each phase of the boot process may be stored in a storage area such as NVRAM or specialized partition of a storage drive (e.g., ESP). If an option for remote logging is enabled (e.g., in the BIOS), such boot logs may be transmitted to a remote telemetry server (e.g., via a preboot network interface method or any other suitable mechanism).

During a system failure, failure logs may also be sent to the telemetry server. Further, any appropriate diagnostics may be run based on the types of failures detected. Information regarding each failure may be stored as an extension to a structure in the UEFI firmware resource table with OEM extensions (e.g., a manufacturer-specific extension of an Extensible Firmware Interface (EFI) System Resource Table (ESRT)). This may enable keeping track of a diagnostic failure count and its corresponding firmware device information.

FIG. 2 illustrates a flow chart of an example method 200 in accordance with embodiments of the present disclosure. As shown in FIG. 2, portions of method 200 may take place at information handling systems 240-1 through 240-$n$ (collectively, information handling system 240), which may be information handling systems such as information handling system 102. In particular, portions of method 200 may take place at a BIOS of information handling systems 240. In other embodiments, such portions may take place at a management controller of an information handling system 240 (e.g., if such system is in an error state that prevents the BIOS from carrying out such methods). Other portions of method 200 may take place at telemetry server 250.

At step 202, the BIOS of an information handling system performs a Power-On Self-Test (POST) and executes an onboard diagnostics module. For example, the onboard diagnostics module may be configured to detect hardware, software, firmware, and/or configuration problems affecting the boot procedure.

If no such problems are detected at step 204, the method may proceed to a normal boot of the operating system at step 206. In some embodiments, as noted above, logs of the successful normal boot and the time of the boot may be transmitted to telemetry server 250.

If, on the other hand, some problem is encountered at step 204, the method may proceed to step 208. In some embodiments, a QR code and/or error message may be displayed to a user of the information handling system at this point. Such an error message may indicate the nature of the problem, suggest possible remedies, etc.

If the detected problem is one that can be remedied by reinstalling the operating system and/or restoring files from a backup, this option may be initiated at step 210. (For example, software issues that prevent booting an information handling system may generally fall into this category.) Once the problem has been so remedied, information about the problem and its solution (e.g., error codes and failure count information) may be transmitted to telemetry server 250 at step 212.

If, on the other hand, the problem that was detected at step 204 does not lend itself to solution by reinstalling the operating system and/or restoring files from a backup, the method may proceed instead to step 214. At step 214, information about the problem (e.g., error code and failure count information) may be transmitted to telemetry server 250.

At step 216, telemetry server 250 may analyze the information collected from information handling system 240-1 and from other information handling systems. For example, telemetry server 250 may aggregate such data and analyze it based on criteria such as error count, system health data, firmware versions for various components of the information handling system, firmware configuration settings, bug check codes, etc.

At this step, telemetry server 250 may determine correlations between various reported problems. For example, telemetry server 250 might determine that a particular firmware version for a particular information handling resource causes problems in a particular hardware configuration, etc. In general, telemetry server 250 may operate in a pre-programmed fashion and/or in a "learning" fashion, in which feedback regarding successful and unsuccessful resolutions is incorporated into future recommendations.

Based on its analysis, telemetry server may determine an appropriate resolution at step 218. For example, solutions such as rolling back or updating a firmware, reconfiguring a firmware, updating an ESRT entry, applying a security update, disabling an information handling resource, changing a boot path, etc. may all be considered as resolutions for a given problem. The determination of which resolution is best may be based on an analysis of all of the data collected, information about which resolutions have been successful or unsuccessful in the past, manual entry of resolution information, or any other suitable method.

Once a resolution has been determined, it may be applied to information handling system 240-1 at step 220. Further, the determined resolution may also be applied to any other information handling systems (e.g., information handling systems 240-2 through 240-n) that encounter the same or similar problems. Such systems may also transmit their own diagnostics and health data to telemetry server 250.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

FIG. 3 illustrates a flow chart of another example method 300 in accordance with embodiments of the present disclosure. At step 302, the BIOS of the information handling system may launch a diagnostics engine based on a boot failure, a device failure, and/or an operating system boot failure. In some embodiments, the BIOS may pass any relevant error codes to the diagnostics engine.

At step 304, the diagnostics engine performs diagnostics on each relevant firmware device. In some embodiments, these diagnostics may be executed as modules of the diagnostics engine to investigate the failures detected by the BIOS. In the example shown, diagnostics are run against a network LOM device 306, a wireless device 308, and a RAM DIMM 310. Device data such as failure codes, firmware version information, and severity information may be logged at step 312. Such logs may be stored, for example, in a NVRAM, or a specialized partition of a storage drive (e.g., an ESP partition or a utility partition).

At step 314, logs are transmitted to a telemetry server, for example by using an HttpPost( ) method. Logs transmitted to the telemetry server may be used to check the severity, the version details, the failure rates, etc.

At step 316, the telemetry server may execute data analytics/algorithms to determine an appropriate resolution to the boot problem. As shown, several types of resolution may be considered at step 316, and the most appropriate may be selected. For example, possible resolutions may include various types of firmware update, such as system firmware, embedded controller firmware, USB type-c firmware, etc., resetting a device to factory defaults, deactivating a feature or device, blocking a device from the boot path, etc. In some embodiments, aggregated information regarding failure rates, hardware configurations, etc. may be considered in arriving at the determination of the best problem resolution.

At step 318, the BIOS may receive an indication of the resolution selected by the telemetry server (e.g., via an HttpGet( ) call).

At step 320, the BIOS may update an ESRT of the information handling system with telemetry and/or resolution information provided by the telemetry server. In some embodiments, if the BIOS is offline or if network issues prevent it from reaching the telemetry server, a software agent executing on the operating system may use the logs stored by the BIOS and check for any telemetry updates from the telemetry server.

Such a software agent may then update the ESRT with proprietary information for recommendations on updates to firmware devices, recommended configurations for the devices, recommended firmware rollbacks, etc. In some embodiments, this information may be may be based on the OEM and based on hardware-specific requirements.

Finally, upon any subsequent boots, the BIOS and/or the operating system 322 (or a software agent executing thereon) may query the ESRT to determine whether any updates are recommended, and perform the necessary actions automatically.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory coupled to the at least one processor;
   wherein the information handling system is configured to:
   detect a problem during a boot of the information handling system;
   transmit telemetry data associated with the problem to at least one remote telemetry server, wherein the at least one remote telemetry server is configured to analyze the telemetry data and other telemetry data from other information handling systems;
   store the telemetry data in a manufacturer-specific extension of an Extensible Firmware Interface (EFI) System Resource Table (ESRT) of the information handling system;
   receive resolution instructions from the at least one remote telemetry server; and
   implement a resolution of the detected problem based on the resolution instructions.

2. The information handling system of claim 1, wherein the resolution includes updating a firmware of the information handling system to a new firmware version or rolling back the firmware to a previous firmware version.

3. The information handling system of claim 1, wherein the detecting, transmitting, receiving, and implementing are carried out by a Basic Input/Output System of the information handling system.

4. The information handling system of claim 1, wherein the resolution includes applying a security update to a component of the information handling system.

5. The information handling system of claim 1, wherein the information handling system is further configured to:
   detect a successful boot of the information handling system that does not include the problem; and
   transmit data associated with the successful boot to the at least one remote telemetry server, wherein the at least one remote telemetry server is configured to aggregate the data associated with the successful boot and other data associated with successful boots from other information handling systems.

6. The information handling system of claim 1, wherein the telemetry data includes a failure count associated with the problem.

7. The information handling system of claim 1, wherein the resolution includes disabling an information handling resource of the information handling system.

8. A method comprising:
   detecting, by an information handling system, a problem during a boot of the information handling system;
   the information handling system transmitting telemetry data associated with the problem to at least one remote telemetry server, wherein the at least one remote telemetry server is configured to analyze the telemetry data and other telemetry data from other information handling systems;
   the information handling system storing the telemetry data in a manufacturer-specific extension of an Extensible Firmware Interface (EFI) System Resource Table (ESRT);
   the information handling system receiving resolution instructions from the at least one remote telemetry server; and
   the information handling system implementing a resolution of the detected problem based on the resolution instructions.

9. The method of claim 8, wherein the resolution includes updating a firmware of the information handling system to a new firmware version or rolling back the firmware to a previous firmware version.

10. The method of claim 8, wherein the detecting, transmitting, receiving, and implementing are carried out by a management controller of the information handling system.

11. The method of claim 8, wherein the resolution includes applying a security update to a component of the information handling system.

12. The method of claim 8, further comprising:
    detecting a successful boot of the information handling system that does not include the problem; and
    transmitting data associated with the successful boot to the at least one remote telemetry server, wherein the at least one remote telemetry server is configured to aggregate the data associated with the successful boot and other data associated with successful boots from other information handling systems.

13. The method of claim 8, wherein the telemetry data includes a failure count associated with the problem.

14. The method of claim 8, wherein the resolution includes disabling an information handling resource of the information handling system.

15. A telemetry server information handling system comprising:
    at least one processor; and
    a memory coupled to the at least one processor;
    wherein the telemetry server information handling system is configured to:
    receive telemetry data from an information handling system, the telemetry data being associated with a problem detected during a boot of the information handling system, wherein the telemetry data is stored in a manufacturer-specific extension of an Extensible Firmware Interface (EFI) System Resource Table (ESRT) of the information handling system;
    analyze the telemetry data and other telemetry data received from other information handling systems; and
    based on the analyzing, transmit resolution instructions to the information handling system, wherein the information handling system is configured to implement a resolution of the detected problem based on the resolution instructions.

16. The telemetry server information handling system of claim 15, wherein the analyzing includes determining that the problem is associated with a first hardware configuration.

17. The telemetry server information handling system of claim 16, wherein the analyzing includes determining that the problem is not associated with a second, different hardware configuration.

18. The telemetry server information handling system of claim 15, wherein the analyzing includes comparing the telemetry data to known analytics data.

* * * * *